US011529907B2

(12) United States Patent
Aswani et al.

(10) Patent No.: US 11,529,907 B2
(45) Date of Patent: Dec. 20, 2022

(54) ACCESS SYSTEM FOR A WORK VEHICLE

(71) Applicant: DEERE & COMPANY, Moline, IL (US)

(72) Inventors: Monish Aswani, Tiruchirappalli (IN); Mahmed Yasir Shaikh, Solapur (IN); Anil Bhakuni, Roorkee (IN)

(73) Assignee: DEERE & COMPANY, Moline, IL (US)

(*) Notice: Subject to any disclaimer, the term of this patent is extended or adjusted under 35 U.S.C. 154(b) by 172 days.

(21) Appl. No.: 16/595,575

(22) Filed: Oct. 8, 2019

(65) Prior Publication Data

US 2021/0101534 A1    Apr. 8, 2021

(51) Int. Cl.
*B60R 3/02* (2006.01)
*B66B 9/08* (2006.01)
*E06C 5/12* (2006.01)
*E06C 5/44* (2006.01)
*B60R 16/033* (2006.01)

(52) U.S. Cl.
CPC .................. *B60R 3/02* (2013.01); *B66B 9/08* (2013.01); *E06C 5/12* (2013.01); *E06C 5/44* (2013.01); *B60R 16/033* (2013.01)

(58) Field of Classification Search
CPC ........... B60R 3/02; B60R 16/033; B66B 9/08; E06C 5/12; E06C 5/04; E06C 5/06; E06C 5/08; E06C 5/10; E06C 5/14; E06C 5/16; E06C 5/18; E06C 5/44
See application file for complete search history.

(56) References Cited

U.S. PATENT DOCUMENTS

| 3,428,145 A | * | 2/1969 | Lyon | ......................... E06C 7/16 182/103 |
| 3,476,212 A | * | 11/1969 | Eakins | ...................... E06C 7/16 182/103 |
| 4,071,260 A | * | 1/1978 | Marshall, Sr. | ............ B60R 3/02 280/166 |
| 4,073,501 A | * | 2/1978 | Grow | ....................... B60R 3/02 105/445 |
| 4,183,423 A | * | 1/1980 | Lewis | ....................... B66B 9/16 187/244 |
| 4,324,317 A | * | 4/1982 | Winkelblech | ........... B66B 9/025 187/401 |

(Continued)

FOREIGN PATENT DOCUMENTS

JP    2001173019 A    6/2001

*Primary Examiner* — Colleen M Chavchavadze
(74) *Attorney, Agent, or Firm* — Taft Stettinius & Hollister LLP; Stephen F. Rost

(57) ABSTRACT

An access ladder assembly for a work vehicle to enable an operator to move from a ground position to a walkway of the work vehicle. A support rail includes a rail first end connected to a crossbar and a rail second end spaced from the rail first end. A slider is movably connected to the support rail to move from the rail second end toward the rail first end. An actuator includes an actuator first end connected to the crossbar and an actuator second end spaced from the actuator first end, wherein the actuator includes an extended position and a retracted position. A step is operatively connected to the actuator second end and is operatively connected to the slider, wherein the step includes a lowered position when the actuator is at the extended position and a raised position when the actuator is at the retracted position.

19 Claims, 11 Drawing Sheets

(56) References Cited

U.S. PATENT DOCUMENTS

| | | | | |
|---|---|---|---|---|
| 4,800,988 A * | 1/1989 | Dunmore | ............. | E06C 7/16 |
| | | | | 182/120 |
| 5,092,617 A * | 3/1992 | Jones, Jr. | ............. | B60R 3/02 |
| | | | | 187/273 |
| 6,027,131 A * | 2/2000 | Wijlhuizen | ............. | B60R 3/02 |
| | | | | 280/166 |
| 6,109,854 A * | 8/2000 | Thompson, Jr. | ............. | B64F 1/3055 |
| | | | | 414/393 |
| 6,854,147 B1 * | 2/2005 | Ahlsten | ............. | B64F 1/315 |
| | | | | 414/398 |
| 7,370,725 B1 * | 5/2008 | Dornfeld | ............. | E06C 7/12 |
| | | | | 182/39 |
| 8,011,473 B1 * | 9/2011 | Gregersen | ............. | E06C 1/16 |
| | | | | 182/101 |
| 8,042,820 B1 * | 10/2011 | Dewees | ............. | B60R 3/02 |
| | | | | 280/166 |
| 8,074,768 B2 | 12/2011 | Rund | | |
| 8,322,489 B1 * | 12/2012 | Denison | ............. | A62B 5/00 |
| | | | | 182/103 |
| 8,668,048 B1 * | 3/2014 | Morris | ............. | E06C 5/04 |
| | | | | 182/127 |
| 8,689,937 B2 * | 4/2014 | Grado | ............. | E06C 7/16 |
| | | | | 182/103 |
| 8,881,867 B2 | 11/2014 | Takenawa et al. | | |
| 8,919,497 B2 * | 12/2014 | Rund | ............. | B60R 3/02 |
| | | | | 182/86 |
| 9,862,324 B2 * | 1/2018 | Schut | ............. | B60R 3/02 |
| 10,036,201 B1 | 7/2018 | Haro et al. | | |
| 10,214,963 B2 * | 2/2019 | Simula | ............. | E06C 5/04 |
| 10,294,077 B2 * | 5/2019 | MacDonald | ............. | B66B 9/083 |
| 10,981,753 B2 * | 4/2021 | Chida | ............. | B66B 5/26 |
| 2001/0030081 A1 | 10/2001 | Morimoto et al. | | |
| 2010/0116590 A1 | 5/2010 | Rund | | |
| 2012/0205195 A1 | 8/2012 | Tsutsumi et al. | | |
| 2013/0092474 A1 * | 4/2013 | Magnussen | ............. | E06C 5/36 |
| | | | | 182/127 |
| 2017/0167197 A1 * | 6/2017 | Johnson | ............. | E06C 5/04 |
| 2017/0188513 A1 * | 7/2017 | Kluver, III | ............. | E06C 7/183 |
| 2017/0362895 A1 | 12/2017 | Simula et al. | | |

* cited by examiner

ACCESS SYSTEM FOR A WORK VEHICLE

FIELD OF THE DISCLOSURE

The present invention generally relates to an access system for a work vehicle, and more particularly to an access lift for a work vehicle.

BACKGROUND

Work vehicles are configured to perform a wide variety of tasks for use as construction vehicles, forestry vehicles, cotton pickers, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work.

Many work vehicles include a cab in which an operator sits or stands while operating the work vehicle when performing work. The cab is supported by a frame of the vehicle and depending on the size of the frame is often located at a relatively high position with respect to the ground. Many work vehicles, therefore, include a ladder with steps attached to the frame to enable the operator to move from the ground to the cab for operating the vehicle.

The operator climbs the steps to reach a platform where a door is located to enable the operator to enter and exit the cab. In certain locations, where the weather can be extremely cold, ice forms on the ladder which makes climbing the ladder difficult. Unexperienced operators, older operators, and even experienced operators, can find it difficult to climb the steps. If an operator is not careful, the operator can slip on ice-coated surfaces of the ladder which can lead to unintended consequences which can affect operator safety.

What is needed therefore is an access device that reduces the difficulty of moving to and from the cab of the vehicle or provides assistance to an operator moving to and from the cab in a variety of weather conditions.

SUMMARY

In one embodiment there is provided an access ladder assembly for a work vehicle. The access ladder assembly includes a crossbar and a support rail having a rail first end operatively connected to the crossbar and a rail second end spaced from the rail first end. A slider is movably connected to the support rail to move from the rail second end toward the rail first end. An actuator includes an actuator first end connected to the crossbar and an actuator second end spaced from the actuator first end wherein the actuator includes an extended position and a retracted position. A step is operatively connected to the actuator second end and operatively connected to the slider, wherein the step includes a lowered position when the actuator is at the extended position and a raised position when the actuator is at the retracted position.

In another embodiment, there is provided an access ladder system for a work vehicle including a frame. The access ladder system includes a battery and a pump operatively connected to the battery. An access ladder includes a support rail having a first rail end operatively connected to the frame and a second rail end spaced from the first rail end. A hydraulic actuator is spaced from the support rail and includes a first actuator end operatively connected to the frame and a second actuator end spaced from the first actuator end. A step is operatively connected to the second rail end of the support rail and is operatively connected to the second actuator end of the hydraulic actuator. A switch device is operatively connected to the battery wherein the switch device includes a first position and a second position. The switch device in the first position retracts the hydraulic actuator to move the step toward the first rail end, and the switch device in the second position moves the step toward the second rail end.

In a further embodiment, there is provided a method of moving an operator of a work vehicle from a ground position to a walkway of the work vehicle. The method includes moving a step of a ladder from a lowered position toward an elevated position in response to actuation of a first switch button; stopping the step once the step reaches the elevated position; and moving the step from the elevated position to the lowered position in response to actuation of a second switch button.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
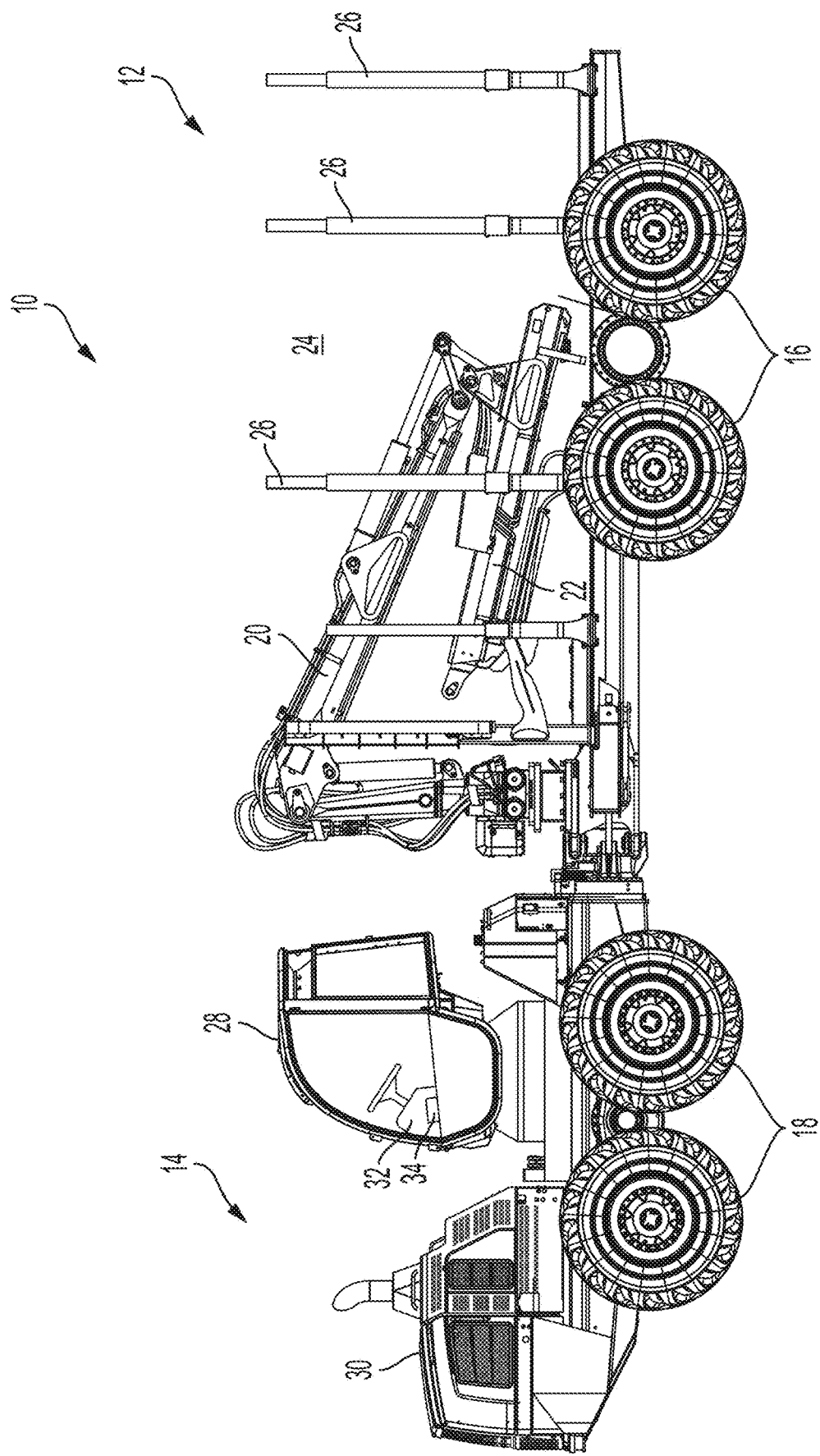
FIG. 1 is an elevational side view of a work vehicle, and more specifically, of a forwarder.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 is an elevational side view of a forwarder 10. The forwarder 10 includes an articulated frame with a rear frame 12 and a front frame 14 respectively supported on wheels 16 and wheels 18. The rear frame 12 supports an arm 20 having a grabber 22 at its outer end. The arm 20 and the grabber 22 are shown in a stowed position located in a loading space 24 surrounded by posts 26. The front frame 14 supports an operator station or cab 28 and an engine compartment 30. During normal driving on roads and in the forest, the cab 28 is located in the position as illustrated in FIG. 1, such that the operator looks forward over the engine compartment 30.

In a forestry operation, trees growing in a forest are felled, delimbed, and cut to into logs with a harvester, which is a self-propelled vehicle. The logs remain at the worksite, typically at the location where the logs have been cut and released by a grappling head of the harvester. The logs may also be collected and placed in one or more piles at the worksite. In some cases, the cut logs are sorted into piles according to defined characteristics, such as an intended use of the logs.

Once a sufficient number of logs have been organized into piles at the worksite, the logs are transported from the worksite using the forwarder 10.

When the operator is collecting logs with the forwarder 10, the cab is rotated 180 degrees around a vertical axis from the position shown in FIG. 1, such that the operator looks toward the arm 20 to pick up the logs and place the logs in the space 24 between the posts 26. In this position, the operator controls the arm 20 and the grabber 22 to take up one or more logs at a time and to deposit them into the loading space 24. Once the loading space 24 is sufficiently filled, the forwarder 10 is driven to another location, generally close to a road, where it deposits the logs that are finally collected by a truck and brought to a next processing stage. In one or more embodiments, a scale is provided between the grabber 22 and the arm 20 to weigh the collected logs. Instead of or additional to sensing the load of the arm 20 with the scale, it is contemplated to sense the load in the loading space 24 with a scale (not shown) between frame 12 and the bottom of the loading space 24, and thus to sense the change in weight as the collected logs are loaded into the loading space 24. The scale equipment can be located anywhere in or outside the forwarder 10, its arm 20, grabber 22 and/or its hydraulics.

While the described embodiments are discussed with reference to the forwarder of FIG. 1, in addition to forestry vehicles, other work vehicles are contemplated including agricultural vehicles, construction vehicles, lawn or turf maintenance vehicles, as well as on-road vehicles such as those used to plow snow, spread salt, or vehicles with towing capability.

The cab 28 defines an operator workstation 32, which is supported by the frame 14. The cab 28 also encloses a seat (not shown) for seating the operator. The operator workstation 32, in different embodiments, includes one or more of an operator user interface 34 including, but not limited to, a steering wheel, a joystick, an accelerator pedal. Pedals for a brake and a clutch are also located in the cabin 28, but are not shown.

The user interface includes a plurality of operator selectable buttons configured to enable the operator to control the operations and functions of the forwarder 10. The user interface, in one embodiment, includes a user interface device including a display screen having a plurality of user selectable buttons to select from a plurality of commands or menus, each of which is selectable through a touch screen having a display. In another embodiment, the user interface includes a plurality of mechanical push buttons as well as a touch screen. In another embodiment, the user interface includes a display screen and only mechanical push buttons. Other embodiments are contemplated.

Figure 2:
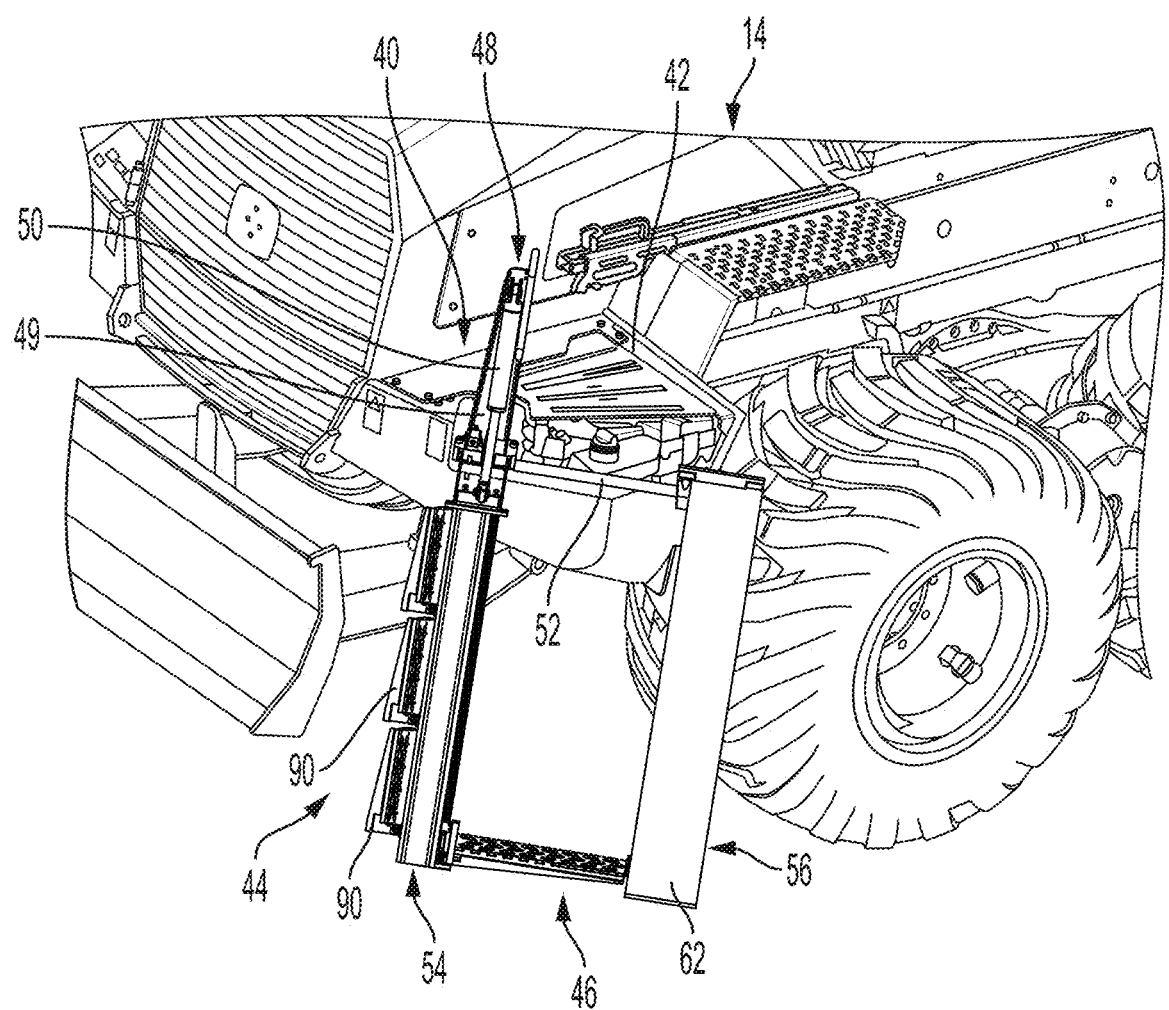
FIG. 2 is a perspective side view of an access system operatively connected to a front frame of a work vehicle.

FIG. 2 illustrates an access portion 40 of the front frame 14 of the vehicle 10 having a walkway 42 upon which the operator walks to gain access to the cab 28. An access system 44 is operatively connected to the front frame 14 to enable the operator to reach the walkway 42 for entering and exiting the cab 28. The access system 44 includes an access ladder assembly 46 and an access ladder positioner 48 operatively connected to the access ladder assembly 46. The access ladder positioner 48 includes a frame 49 fixedly connected to the access portion 40 and an actuator 50 to move the access ladder assembly 46 from a lowered position as shown in FIG. 2 to a raised position (not shown). In one embodiment, the access ladder 46 is rotated about an axis defined by a crossbar 52. In the lowered position, the access ladder assembly 46 is located in a downwardly extending position to enable the operator to use the assembly 46. In the raised position, the ladder assembly 46 is located in an upwardly extending position to substantially prevent the operator from using the ladder assembly 46 and to make access to the cab 28 less likely. During rotation of the assembly 46 from the lowered position to the upwardly extending position, a step 58 remains at its lowered position of FIGS. 2, 3, 4, and 5.

Figure 3:
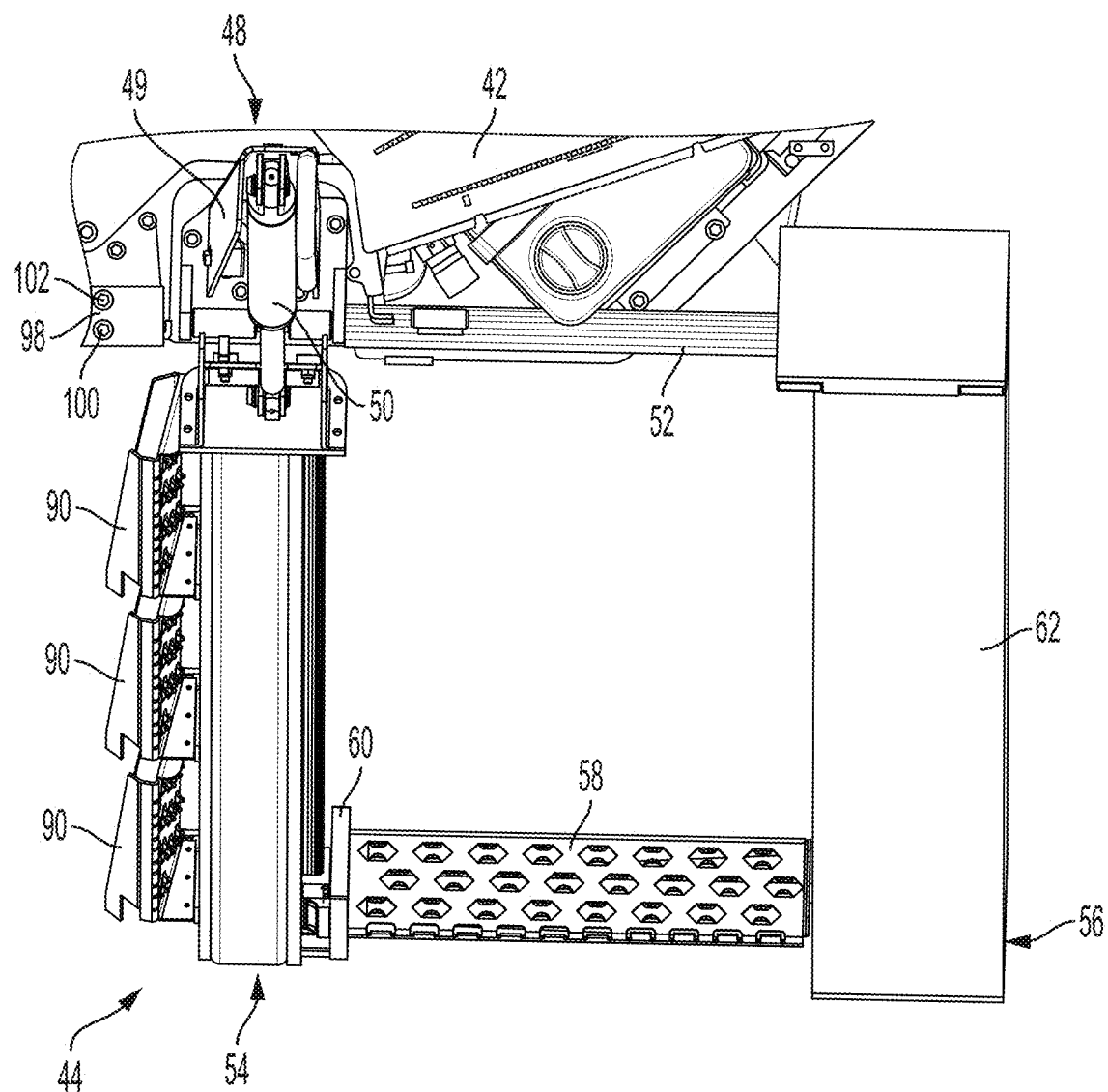
FIG. 3 is a top view of an access system operatively connected to a front frame of a work vehicle.
Figure 10:
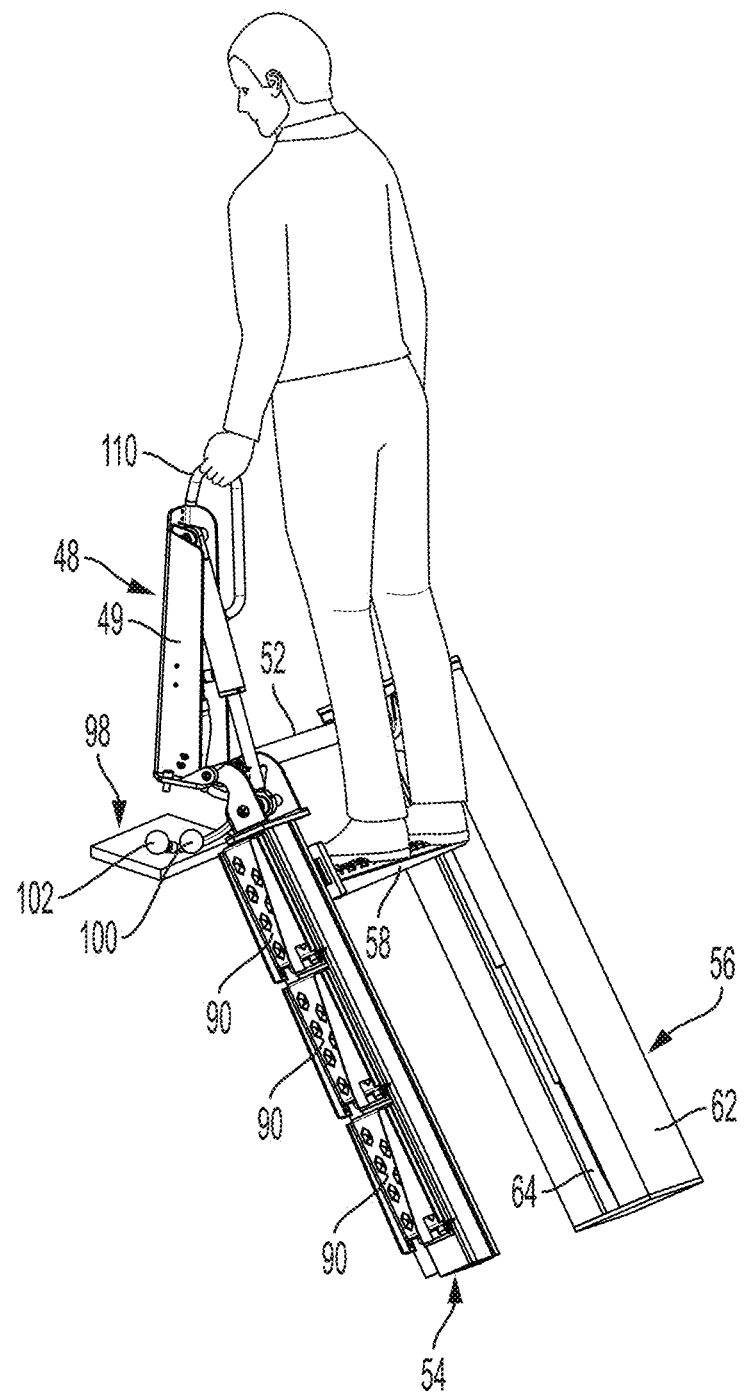
FIG. 10 is a perspective view of an operator on a step of an access system with the step located at an elevated position.

As illustrated in FIGS. 2 and 3, the access ladder assembly 46 includes the crossbar 52 fixedly connected to the front frame 14 at the access portion 40. In another embodiment, the crossbar 52 is rotatably connected to the front frame 14. A support rail 54 is rotatably coupled to one end of the crossbar 52 and a step actuator 56 is rotatably coupled to the other end of the crossbar 52. The step 58 is operatively connected to the support rail 54 and to the step actuator 56. In one example as described herein, the access ladder assembly includes a single step, the step 58. The step 58 moves from the lowered position as illustrated in FIG. 3 to a raised position as illustrated in FIG. 10. A slider 60 is movably connected to the support rail 54 to facilitate movement of the step 58 from the lowered position to the raised position. In other embodiments, a movable step support is movably connected to the support rail 54.

Figure 4:
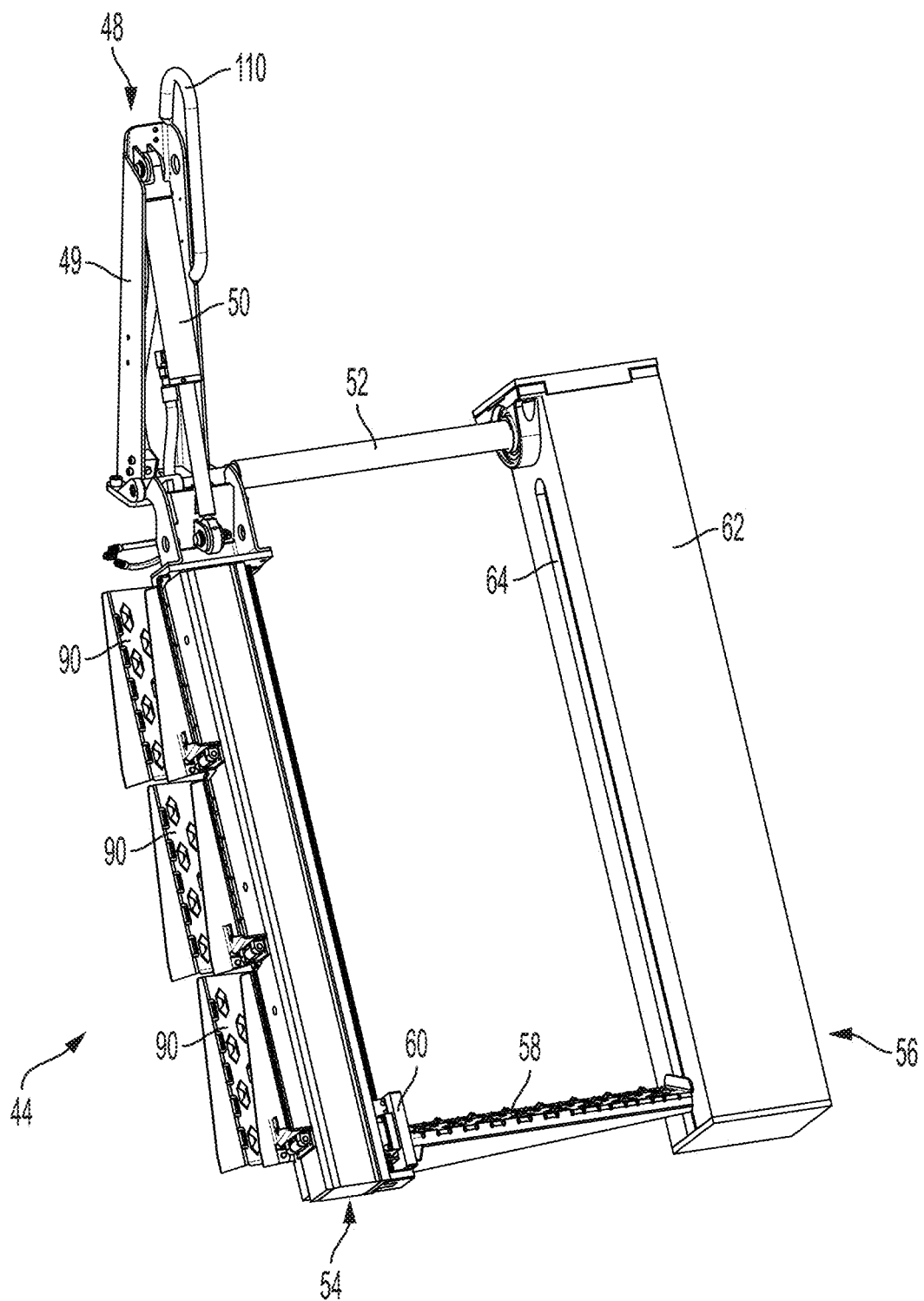
FIG. 4 is a perspective view of an access system for a work vehicle.
Figure 5:
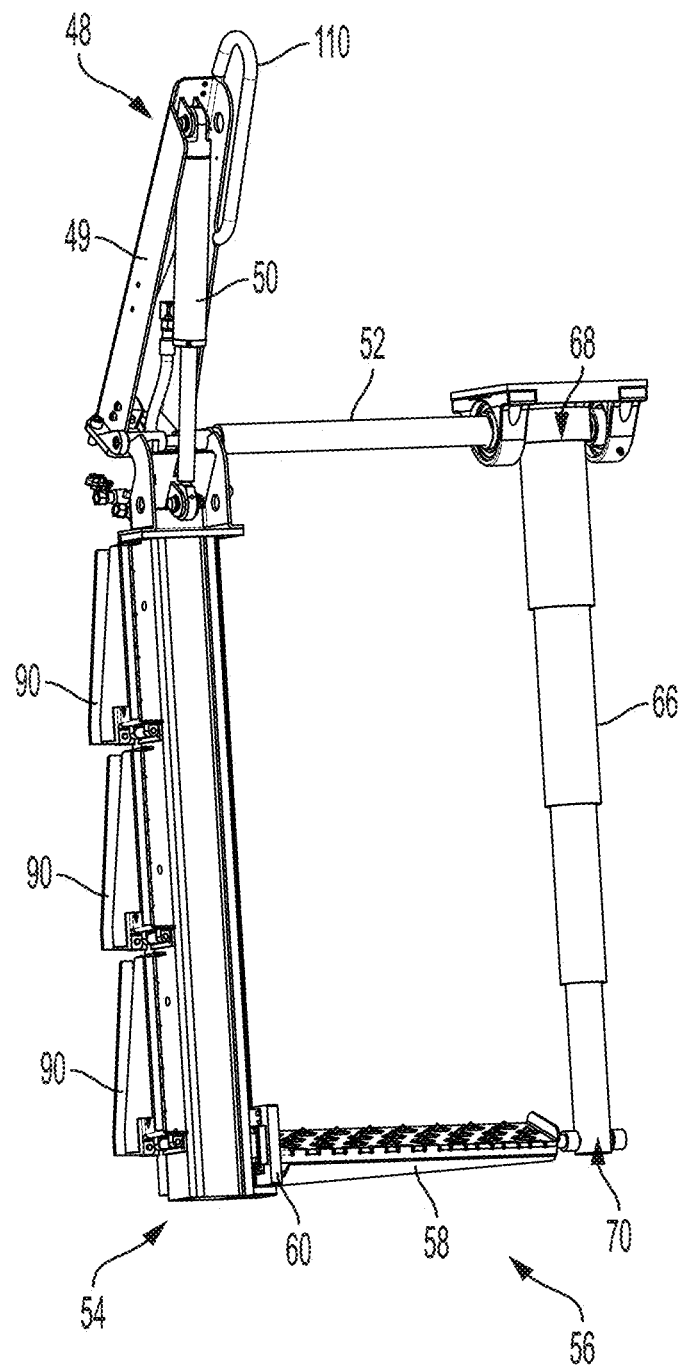
FIG. 5 is a partial perspective view of an access system for a work vehicle.

As illustrated in FIGS. 4 and 5, the step actuator 56 includes an actuator housing 62 defining a slot 64 through which an end of the step 58 extends and which is coupled to an actuator 66. The actuator 66 includes a first end 68 operatively connected to the crossbar 52 and a second end 70 operatively connected to the step 58. The actuator 66 in the extended position of FIG. 5 retracts to move the step from the lowered position of FIG. 5 to the raised position of FIG. 10. In one embodiment, the actuator 66 is a hydraulic cylinder. In other embodiments, other types of actuators are contemplated.

Figure 6:
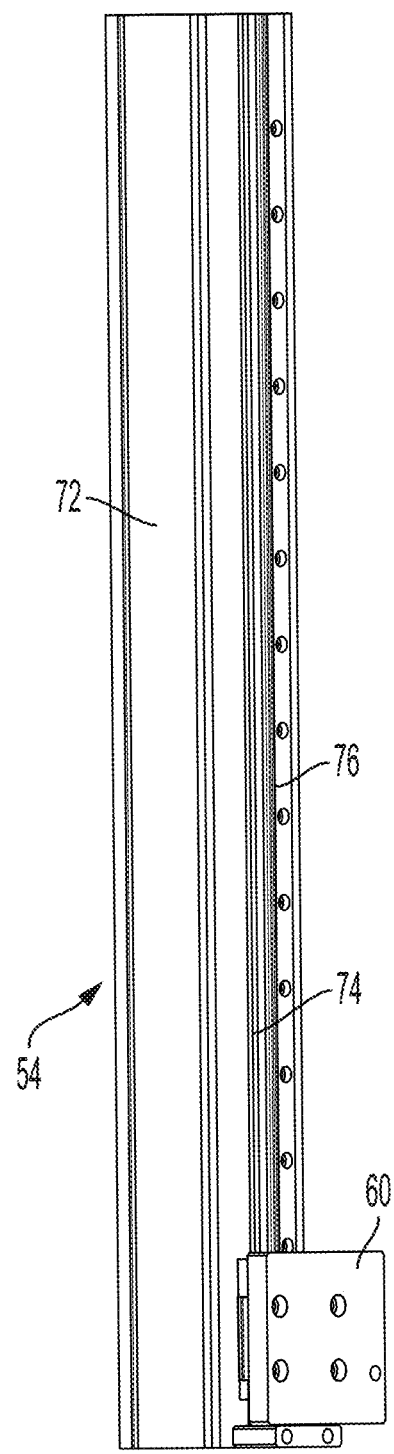
FIG. 6 is a perspective view of a support rail of an access system for a work vehicle.

As illustrated in FIG. 6, the support rail 54 includes a housing 72 defining a slot 74 that extends along the length of the support rail 54. The slider 60, and consequently the step 58, moves along the slot 74 as the actuator 66 moves from the extended position to the retracted position. The slider 60 is operatively connected to a row or line of bearing contacts (not shown) to which the slider 60 is connected. As the slider 60 moves from the extended position of the step to the retracted position of the step, the bearing contacts support sliding movement of slider 60 along the slot 74. In one embodiment, a linear rail 76, fixed to the housing 72, includes one or more tracks configured to accept the slider 60. In one embodiment, the slider 60 includes linear bearings that engage the one or more tracks of the linear rail 76 for bearing supported movement along the tracks. Other embodiments are contemplated, including but not limited to, a slider having roller bearings configured to engage a rail supported by the housing 72. The housing 72 remains rigid in the described embodiment, as the slider 60 moves along the linear rail 76. As the actuator 66 retracts, the step 58 moves linearly along the linear rail 76 to provide a predictable linear movement of the step which provides a stable platform for the operator.

Figure 7:
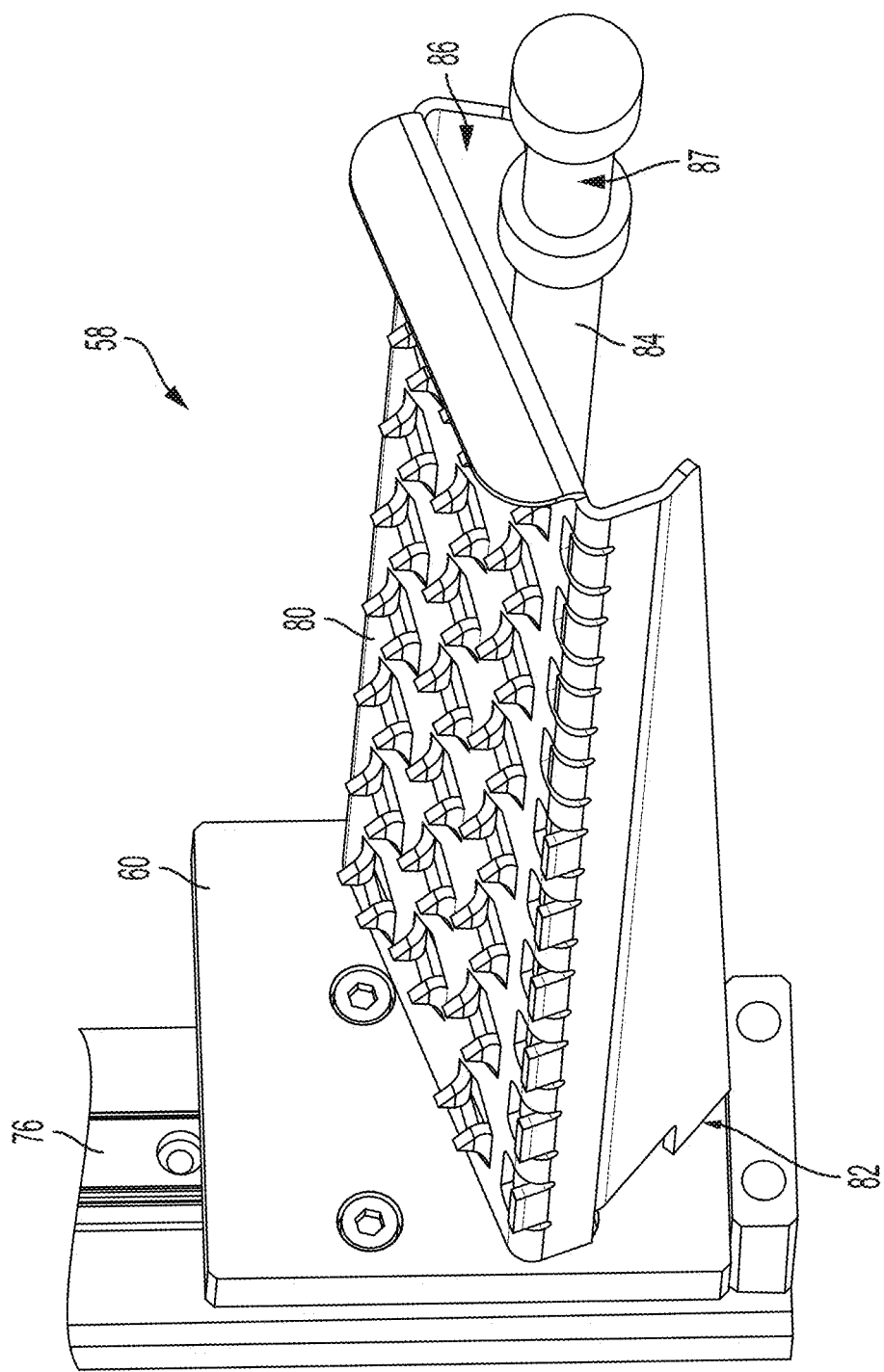
FIG. 7 is a perspective view of a slider and a step operatively connected to a support rail.

As seen in FIG. 7, the step 58 includes a platform 80 having a first end 82 fixedly connected to the slider 60. A support rod 84 subtends the platform 80 to support the platform 80 and extends from the slider 60 to the second end 70 of the actuator 66 as seen in FIG. 5. An end 86 of the support rod 84 defines a recess 87 that engages the second end 70 of the actuator 66 to substantially fix the location of the support rod 84 at the end 70 and to prevent movement of the second end 70 with respect to the step 58. As the actuator 66 retracts toward the crossbar 52, the step 58 is pulled toward the crossbar 52 and slides along the rail 76. In the illustrated embodiment, the step 58 includes a first part, the platform 80, and a second part, the support rod 84. In other embodiments, the step 58 is a unitary part consisting of a single part. Other configurations are contemplated.

Figure 8:
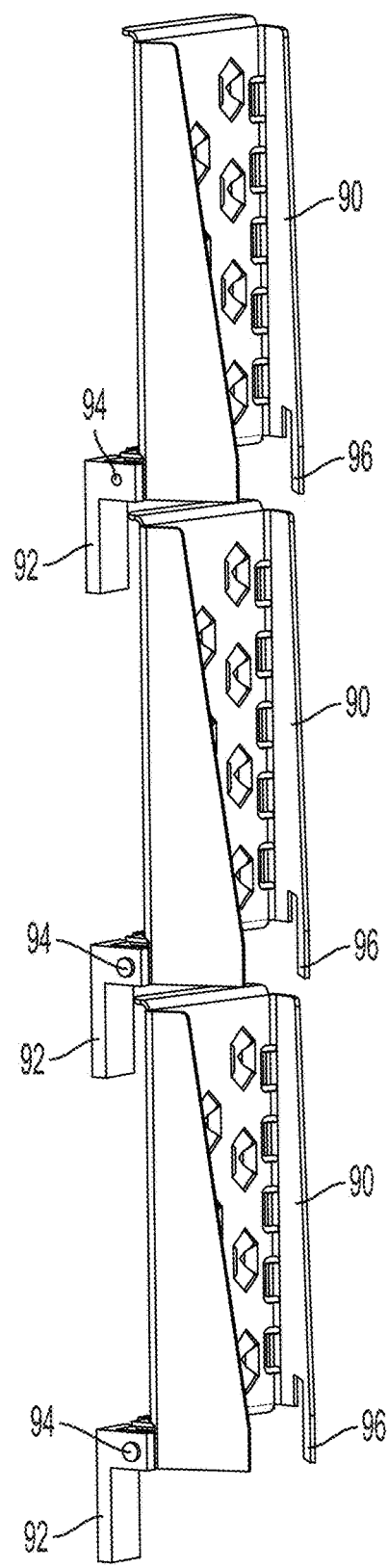
FIG. 8 is a perspective view of a plurality of backup steps.

FIG. 8 illustrates a plurality of backup steps 90 each of which is rotatably coupled to the support rail 54 as illustrated in FIGS. 2-5. In other embodiments, the backup steps are coupled to the actuator housing 62. The backup steps are available for use if the access ladder assembly 46 does not work as intended for any reason including a mechanical, an electrical, or weather related incident. Each of the backup steps 90 rotates from the upward position as shown in FIG. 8, to a relatively level position (not shown), with each of the backup steps 90 being in a substantially horizontal position. In one embodiment, each of the backup steps 90 is operatively connected together such that downward rotation of one step 90 moves each of the remaining steps 90 to the horizontal position. Step supports 92 are fixedly connected to the support rail 54 and include an axis 94 about which the backup steps 90 rotate. Each step 90 includes an extension 96 that engages a slot (not shown) in the support rail 54 when the backup steps are moved to the horizontal position. In this way, each of the backup steps 90 are supported by the step support 94 and the extension 96 for the operator when needed. The backup steps 90 includes a first position substantially aligned along a longitudinal axis of the support rail housing and a second position generally inclined with respect to the longitudinal axis of the support rail housing.

Figure 9:
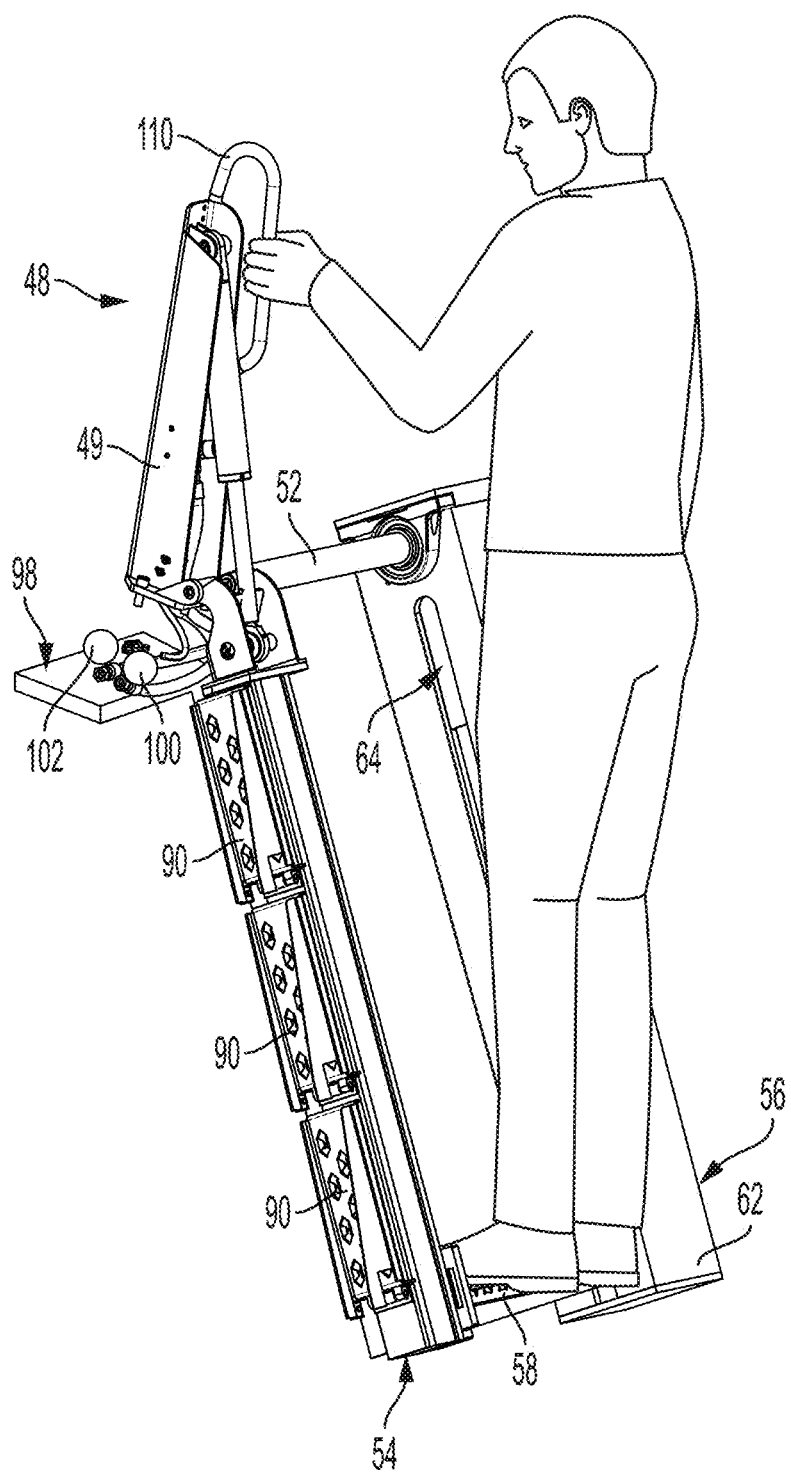
FIG. 9 is a perspective view of an operator on a step of an access system with the step located at a ground position.
Figure 11:
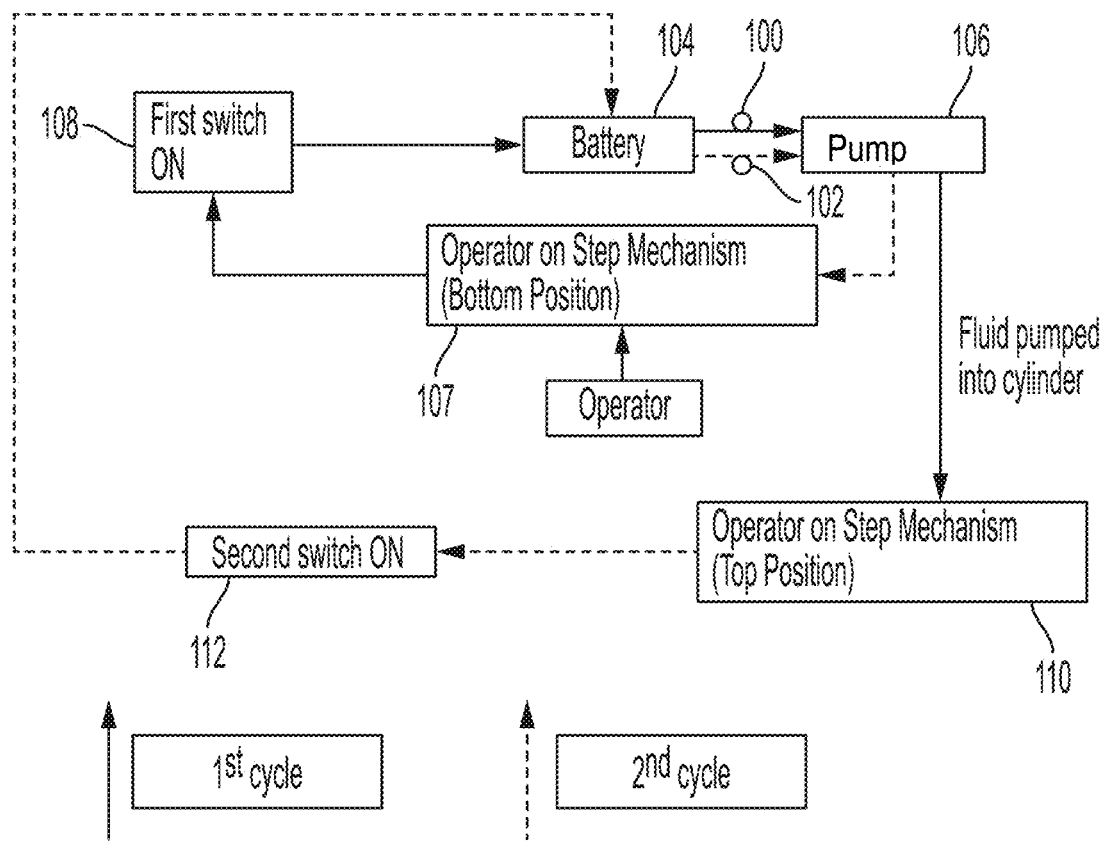
FIG. 11 is a block diagram of a process to move a step of an access system from a ground position to an elevated position and from the elevated position to the ground position.

As illustrated in FIGS. 9 and 10, the access device includes a user interface 98 operatively connected to the actuator 66 to move the actuator 66 of FIG. 5 from the extended position in FIG. 9 to the retracted position of FIG. 10, and back to the extended position. The user interface 98 includes a user input device such as a first switch button 100 and a second switch button 102 each of which is operatively connected to a battery 104 and a pump 106 illustrated in FIG. 11. In one embodiment, the battery 104 is the existing vehicle battery. In other embodiments, the battery 104 is a different battery than the existing vehicle battery. The battery 104 is operatively connected to the pump 106 through each of the switch buttons 100 and 102. The pump is operatively connected to the actuator 66. When the operator is located at and supported by the step 58 of FIG. 9 and as shown at block 107 of FIG. 11, the operator selects the switch button 100 at block 108 which electrically couples the battery 104 to the pump 106. Upon actuation of the switch button 100, the pump 106 discharges pump fluid, (depressurizes the hydraulic actuator) from the hydraulic actuator 66 which retracts the actuator 66 to move the operator from the lowered position illustrated in FIG. 9 to the elevated position illustrated in FIG. 10 where the step 58 stops. The operator then steps from the step 58 at this elevated position and walks to the cab 28 along the walkway 42. In one embodiment, the switch button 100 directly connects the battery 104 to the pump 106 so that the step 58 moves from the extended position to the retracted position and vice versa. In this embodiment, the engine does not need to be running. It is understood that the use of a pump typically includes a motor in combination with the pump.

When the operator leaves the vehicle, the operator steps on the elevated step 58 of FIG. 10. The access ladder positioner 48 includes a handle 110, supported by the frame 49, which the operator can use for positioning on the step 58 at block 110. Once the operator is ready to descend to the ground, the operator actuates or presses the switch button 102 at block 112 of FIG. 11. The switch button 102 causes the pump 106, in one embodiment, to pressurize the hydraulic cylinder (the actuator 66) by pumping fluid into the hydraulic cylinder to lower the operator to the ground. In one or more embodiments, the direction of pumping fluid is reversed to accommodate different types of actuators. In other embodiment, the actuator 66 is a motor driven linear actuator which includes but is not limited to belt driven, screw-driven, rack-and-pinion driven, and linear motor driven actuators.

In one example, the switch buttons 100 and 102 are located adjacently to the ladder positioner 48 as illustrated. In other embodiments, the switch buttons 100 and 102 are located at the handle 110. Other locations of the switch buttons 100 and 102 are contemplated. In a further embodiment, a single switch button is used and includes multiple positions to provide for movement of the step 58 from the lowered position to the elevated position and vice versa. Toggle devices are also contemplated.

While exemplary embodiments incorporating the principles of the present disclosure have been described hereinabove, the present disclosure is not limited to the described embodiments. For instance, while the described embodiments include a single step, in other embodiments a second step is included to provide an optional step location so that the operator can select a step appropriate for the operator's body type. Instead, this application is intended to cover any variations, uses, or adaptations of the disclosure using its general principles. In addition, while the terms greater than and less than have been used in making comparison, it is understood that either of the less than or greater than determines can include the determination of being equal to a value. Further, this application is intended to cover such departures from the present disclosure as come within known or customary practice in the art to which this disclosure pertains and which fall within the limits of the appended claims.

The invention claimed is:

1. An access ladder assembly for a work vehicle comprising:
   a crossbar defining a longitudinal axis, the crossbar including a first end and a second end;
   a support rail having a support rail first end rotatably connected to the first end the crossbar and rotatable about the longitudinal axis of the crossbar, a support rail second end spaced from the support rail first end, and a support rail slot extending from the support rail first end to the support rail second end;

a slider movably connected to the support rail to move along the support rail slot from the support rail second end toward the support rail first end;

an actuator housing having an actuator housing slot located at a side of the actuator housing, wherein the second end of the crossbar extends through a first end of the actuator housing;

an actuator located inside the actuator housing, the actuator having an actuator first end rotatably connected to the second end of the crossbar and rotatable about the longitudinal axis of the crossbar, and an actuator second end spaced from the actuator first end, the actuator including an extended position and a retracted position;

a step extending between the actuator housing slot and the support rail slot, the step operatively connected to the actuator second end through the actuator housing slot and operatively, connected to the slider through the support rail slot, wherein the step moves along the actuator housing slot from a lowered position when the actuator is at the extended position and a raised position when the actuator is at the retracted position, wherein the step is located between the slider and the actuator as the step moves from the lowered position to the raised position; and a plurality of backup steps mounted on a side of the support rail opposite the support rail slot or on a side of die actuator housing opposite the actuator housing slot, wherein each of the plurality of backup steps extends in a direction away from the step.

2. The access ladder assembly of claim 1 wherein the support rail includes a track and the slider slidingly engages the track.

3. The access ladder assembly of claim 2 wherein the slider moves along the track during movement of actuator from the extended position to the retracted position.

4. The access ladder assembly of claim 3 wherein the step includes a platform supported by a support structure, wherein the support structure is connected to the actuator second end and to the slider.

5. He access ladder assembly of claim 4 wherein the support rail includes a rail housing defining the support rail slot along which the slider moves when the actuator moves from the extended position to the retracted position.

6. The access ladder assembly of claim 5 wherein the support structure of the step moves along the actuator housing slot when the actuator moves from the extended position to the retracted position.

7. The access ladder assembly of claim 5 wherein the plurality of backup steps includes a first position substantially aligned along a longitudinal axis of the support rail housing or along a longitudinal axis of the actuator housing and a second position generally inclined with respect to the longitudinal axis of the support rail housing or the longitudinal axis of the actuator housing.

8. The access ladder assembly of claim 1 wherein the support rail includes a rail housing and each of the plurality of backup steps is foldably coupled to one of the rail housing or the actuator housing.

9. The access ladder assembly of claim 1 comprising a user interface operatively connected to the actuator, the user interface including a user input device operatively connected to the actuator, wherein a first actuation of the user input device moves the step from the lowered position to the raised position.

10. The access ladder assembly of claim 9 wherein a second actuation of the user input device moves the step from the raised position to the lowered position.

11. The access ladder assembly of claim 1 further comprising a hydraulic cylinder having a first end operatively connected to one of the support rail or to the actuator housing, wherein the hydraulic cylinder includes a first position to provide access to the step by a user and a second position to not provide access to the step by the user.

12. The access ladder system of claim 1 wherein the support rail and the actuator rotate about the longitudinal axis of the crossbar to enable rotation of the support rail and the actuator between a lowered position and a raised position.

13. An access ladder system for a work vehicle including a frame, the access ladder system comprising:

a battery;

a pump operatively connected to the battery, and an access ladder including a support rail having a first rail end operatively connected to the frame and a second rail end spaced from the first rail end, the support rail including a support rail housing having a support rail housing slot located at a first side of the support rail housing, an actuator spaced from the support rail by a crossbar, wherein the actuator is located inside an actuator housing having an actuator housing slot located at a first side of the actuator housing, the actuator having a first actuator end operatively connected to the frame and a second actuator end spaced from the first actuator end, and a step operatively connected to the second rail end of the support rail and operatively connected to the second actuator end of the actuator, wherein the step is located between the slider and the actuator as the step moves from a lowered position to a raised position;

a switch device operatively connected to the battery, the switch device including a first position and a second position, wherein the switch device in the first position retracts the actuator to move the step toward the first rail end, and the switch device in the second position extends the actuator to move the step toward the second rail end, and a plurality of backup steps mounted on an opposite side of the support rail opposite the first side of the support rail or on an opposite side of the actuator housing opposite the first side of the actuator housing, wherein each of the plurality of backup steps extends in a direction away from the step.

14. The access ladder system of claim 13 wherein the switch device comprises a first switch and a second switch, wherein an ON position of the first switch is the first position of the switch device and wherein an ON position of the second switch is the second position of the switch device.

15. The access ladder system of claim 14 wherein the second switch includes an OFF position, wherein the OFF position of the second switch moves the step toward the first rail end.

16. The access ladder system of claim 15 wherein the support rail includes a track disposed at the support rail housing, the slot extending from the first rail end to the second rail end, and a step support extending through the slot and operatively connected to the track and to the step, wherein the step support moves along the slot in response to actuation of the actuator.

17. The access ladder system of claim 16 wherein the actuator comprises a hydraulic cylinder.

18. The access ladder system of claim 16 wherein each of the plurality of backup steps includes a first position substantially aligned along a longitudinal axis of the support rail housing or a longitudinal axis of the actuator housing and a second position generally inclined with respect to the longitudinal axis of the support rail housing or the longitudinal axis of the actuator housing.

19. The access ladder system of claim 13 wherein the support rail is rotatably coupled to one end of the crossbar and the actuator is rotatably coupled to another other end of the crossbar and wherein the support rail and the actuator rotate about a longitudinal axis of the crossbar to enable rotation of the support rail and the actuator between a lowered position and a raised position.

* * * * *